United States Patent
Suzuki et al.

(10) Patent No.: US 6,433,845 B1
(45) Date of Patent: Aug. 13, 2002

(54) REFLECTION TYPE LIQUID CRYSTAL DISPLAY WITH PARTICULAR ANGLE BETWEEN POLARIZATION AXIS AND QUARTER WAVELENGTH PLATE OPTICAL AXIS

(75) Inventors: Teruaki Suzuki; Koichi Yanai, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/289,595

(22) Filed: Apr. 12, 1999

(30) Foreign Application Priority Data

Apr. 10, 1998 (JP) .......................... 10-099144
Dec. 4, 1998 (JP) .......................... 10-346241

(51) Int. Cl.$^7$ .......................... G02F 1/1335
(52) U.S. Cl. .................. 349/102; 349/113; 349/121; 349/96
(58) Field of Search ................ 349/121, 113, 349/102, 103, 96

(56) References Cited

U.S. PATENT DOCUMENTS

| | | | | |
|---|---|---|---|---|
| 4,984,873 A | * | 1/1991 | Takiguchi et al. | 350/337 |
| 5,139,340 A | * | 8/1992 | Okumura | 359/63 |
| 5,179,458 A | * | 1/1993 | Fukui | 359/73 |
| 5,619,356 A | * | 4/1997 | Kozo et al. | 349/99 |
| 5,699,137 A | * | 12/1997 | Kishimoto | 349/119 |
| 5,721,600 A | * | 2/1998 | Sumiyoshi et al. | 349/119 |
| 5,724,112 A | * | 3/1998 | Yoshida et al. | 349/117 |
| 5,982,463 A | * | 11/1999 | Yamaguchi et al. | 349/99 |

FOREIGN PATENT DOCUMENTS

| | | |
|---|---|---|
| JP | 1-147431 | 6/1989 |
| JP | 3-188420 | 8/1991 |
| JP | 4-116515 | 4/1992 |
| JP | 4-131824 | 5/1992 |
| JP | 5-100114 | 4/1993 |
| JP | 7-146469 | 6/1995 |
| JP | 10-90727 | 4/1998 |
| JP | 2798073 | 7/1998 |
| JP | 10-232390 | 9/1998 |
| JP | 11-295720 | * 10/1999 |
| JP | 2000-171788 | * 6/2000 |

* cited by examiner

Primary Examiner—William L. Sikes
Assistant Examiner—Mike Qi
(74) Attorney, Agent, or Firm—Young & Thompson

(57) ABSTRACT

The normally white reflection type liquid crystal display of the present invention comprises: a polarization plate; a quarter wavelength plate; a transparent substrate; a transparent electrode; and a twisted nematic liquid crystal layer, wherein said polarization plate, said quarter wavelength plate, said transparent substrate, said transparent electrode, and said twisted nematic liquid crystal layer are layered in sequence from a light inputting side, and the angle between the optical axis of said quarter wavelength plate and the transmission axis of said polarization plate is below 65 degrees and above 45 degrees, or below 45 degrees and above 25 degrees.

7 Claims, 13 Drawing Sheets

REFLECTION TYPE LIQUID CRYSTAL DISPLAY WITH PARTICULAR ANGLE BETWEEN POLARIZATION AXIS AND QUARTER WAVELENGTH PLATE OPTICAL AXIS

BACKGROUND OF THE INVENTION

1. Field of the Invention

The present invention relates to a reflection type liquid crystal display which can increase the contrast ratio.

Further, the present invention relates to a reflection type liquid crystal display in which angles of a polarization plate, a half wavelength phase difference film, and a quarter wavelength phase difference film are adjusted so that change in retardation of a liquid crystal layer depending on the viewing angle is cancelled by the change in retardation of the phase difference films depending on the viewing angle.

This application is based on Japanese Patent Applications Nos. 10-099144 and 10-346241, the contents of which are incorporated herein by reference.

2. Description of the Related Art Including Information Disclosed Under 37 CFR 1.97 and 1.98

In recent years, reflection type liquid crystal displays which do not use a back light, which can reduce consumption of power, and which are used in various mobile devices driven by batteries have become widely used. The most popular system currently in use is a twisted nematic system (hereinafter referred to as TN). In the following, the prior liquid crystal display will be explained with reference to figures.

FIG. 20 is a cross-sectional side view showing the first reflection type liquid crystal display using the TN system of the background art. The first conventional reflection type liquid crystal display 400 comprises a pair of transparent substrates which are an upper substrate 401 and an lower substrate 402 arranged in parallel and separated from each other by approximately 5 μm, and a liquid crystal layer 403 whose orientation is twisted by 90 degrees and which is provided between the substrates 401 and 402.

Polarization plates 406 and 407 are laminated on the surfaces of the transparent substrates which are not in contact with the liquid crystal layer. The lower substrate 402 has a reflector plate 108 on the outer surface of the polarization plate 407. Transparent electrodes 404 made of a transparent conductive material such as indium tin oxide (ITO) are laminated on the surfaces of the upper and lower substrates 401 and 402 in contact with the liquid crystal layer. On these transparent electrodes 404, an orientated film 405 is formed. By applying an electric field via the transparent electrodes 404 to the liquid crystal layer 403, the orientation of the liquid crystal is changed. Because of this change, incident light is reflected by the reflector plate 408, changing the strength of the incident light and producing images.

However, there is a problem in the first reflection type liquid crystal display 400 using the conventional TN system, which is described below. The incident light passes through the two polarization plates 406 and 407 twice one way, that is, four times return trip. Because the two polarization plates 406 and 407 absorb not only polarized light in a direction of the absorption axis but also slightly polarized light in the direction of the transmission axis, the light incurs an optical loss every time the light passes the polarization plates 406 and 407. The optical loss decreases brightness of the display so that the first reflection type liquid crystal display using the two polarization plates 106 and 107 cannot produce bright images.

Between the liquid crystal layer 403 and the reflector plate 408, the transparent lower substrate 402 with a thickness of approximately 1 mm is provided. When a viewer looks at the device obliquely, a doubled image may appear because of parallax. Although one of the reflection type liquid crystal displays uses a super twisted nematic (hereinafter referred to as STN) in which the twist angle of the liquid crystal layer 203 is increased to approximately 200 degrees, the STN device has the disadvantages of decreasing brightness and the problem of parallax, like the TN system, because the STN device uses the two polarization plates.

To solve the problem, a report by A. R. Kmetz, which appears in "Proceedings of the SID" Vol. 21, No. 2, pp. 63–65, describes a reflection type liquid crystal display using a single polarization plate. Because the incident light passes through the polarization plate only twice, this reflection type liquid crystal display reduces the optical loss as compared with the first conventional liquid crystal display. Since the polarization plate is eliminated from the rear side of the liquid crystal layer, the electrodes of the substrate facing the light inputting side may be formed of metal, etc., as a reflector electrode, which can solve the problem caused by the parallax.

Japanese Patent Application, First Publication No. 4-116515 discloses a reflection type liquid crystal display using a single polarization plate, and the optimization of three parameters of the twist angle of a liquid crystal layer, the product (hereinafter referred to as Δnd) of anisotropy of the refractive index of the liquid crystal layer and its thickness (hereinafter referred to as a cell gap), and the angle of the polarization plate. The angle of the polarization plate is between either the transmission axis or the absorption axis and the direction of the orientation of the liquid crystal in the light inputting side. FIG. 21 is a cross-sectional view showing the structure of the second reflection type liquid crystal display disclosed in Japanese Patent application, First Publication No. 4-116515. A transparent electrode 404 and a stretched film 405 are formed on an upper substrate 401. A reflector electrode 409 and a stretched film 405 are formed on a lower substrate 402. The liquid crystal layer 403 is provided between the upper and lower substrates 401 and 402, which are arranged in parallel. The light inputting side of the upper substrate 401, that is, the surface opposite to the transparent electrode 404, is coated with a polarization plate 406.

According to the optimized design parameters taught by Japanese Patent Application, First Publication No. 4-116515, the twist angle of the liquid crystal layer 403 is 63 degrees, the Δnd of the liquid crystal layer 103 is 0.2 μm, and the angle of the polarization plate is zero.

In the second conventional liquid crystal display 400 designed according to the above parameters, linearly polarized light output from the liquid crystal layer 403 is converted into circularly polarized light. Further, the light, which is reflected and is transmitted through the liquid crystal layer 403, is converted into a linearly polarized light whose polarization plane is rotated from that of the incident light by approximately 90 degrees. Therefore, the polarization conversion by the liquid crystal layer 403 is remarkably efficient.

Further, a report by S. -T. Wu in "1997 SID International Symposium Digest of Technical Papers" Vol. 28, pp. 643–646, 1997 teaches optimized design parameters in the second conventional reflection type liquid crystal display 400 using a single polarization plate. The design parameters described in the report are shown in the following: the twist angle of the liquid crystal layer is 90 degrees, the value Δnd of the liquid crystal layer is 0.25 μm, and the angle of the polarization plate is 20 degrees. The report teaches other design parameters for the reflection type liquid crystal display: the twist angle of the liquid crystal layer is 70 degrees, the value Δnd of the liquid crystal layer is 0.28 μm, and the angle of the polarization plate is 20 degrees.

The element designed according to these parameters is a normally black element. That is, the element is in a dark state when no voltage is applied, while the element is in a light state when a voltage is applied.

FIG. 22 is a cross-sectional side view showing a third conventional reflection type liquid crystal display. Except that a quarter wavelength plate 410 is inserted between the polarization plate 406 and the upper substrate 401, the third conventional reflection type liquid crystal display 400 is identical to the second conventional liquid crystal display. The third liquid crystal display 400 has a normally white element.

The quarter wavelength plate 410 is a birefringence plate which produces an optical path difference of a quarter wavelength between linearly polarized light oscillating in a vertical direction. The quarter wavelength plate 410 converts the linearly polarized light into circularly polarized light, which is rotated to the right or the left. Thus, the third conventional liquid crystal display is in the light state when no voltage is applied, while the display is in the dark state when a voltage is applied. This normally white element of FIG. 22 reduces dependency on the cell gap and on the wavelength, and is more preferable than the second conventional liquid crystal display.

Japanese Patent Application, First Publication No. 10-232390 discloses a reflection type liquid crystal display using the STN liquid crystal layer and a single polarization plate whose twist angle is above 180 degrees, preferably is 240 degrees. The design parameters of the liquid crystal layer, the phase difference film, and the polarization plate, are optimized so as to make the displayed colors achromatic and to increase the contrast ratio.

Japanese Patent Application, First Publication No. 7-146469 discloses a reflection type liquid crystal display which comprises an upper substrate, a lower substrate, a liquid crystal element with nematic liquid crystal molecules twisted by 90 degrees between the upper substrate and the lower substrate, a polarization plate, a reflector plate, and a quarter wavelength plate. In this background art, an angle between the light absorption axis of the polarization plate and the longitudinal axis of the liquid crystal molecules is 85 to 95 degrees. An angle between the retardation axis of the quarter wavelength plate and the longitudinal axis of the liquid crystal molecules adjacent to the quarter wavelength plate is zero. The product Δnd of the anisotropy of the refractive index Δn of the liquid crystal layer and the thickness of the liquid crystal layer d is 500 to 700 nm.

Japanese Patent Application, First Publication No. 5-100114 discloses a laminated polarization plate for producing circularly polarized light from monochromatic light, which comprises a half wavelength phase difference film and a quarter wavelength phase difference film.

Japanese Patent Application, First Publication No. 10-090727 discloses a reflection type liquid crystal display in which an absorption axis of a polarization plate forms 35 to 55 degrees, preferably 40 to 50 degrees with respect to an orientation direction of liquid crystal molecules adjacent to a boundary of a substrate. The product of anisotropy of the refractive index of the liquid crystal layer and the thickness of the liquid crystal layer is 0.1 to 0.18 μm, and preferably is 0.12 to 0.16 μm.

Japanese Patent No. 2798073 discloses a reflection type liquid crystal display which comprises a liquid crystal layer and a compensation layer. The anisotropy of the refractive index of the compensation layer is identical to that of the liquid crystal layer. Then, the optical axis of the compensation layer intersects the longitudinal axis of the liquid crystal layer at a right angle, and the angle between the optical axis of the compensation layer and the absorption axis or transmission axis of a polarization plate is 45 degrees or 135 degrees. In the background art, dependency of the amount of birefringence on the wavelength in the liquid crystal layer is cancelled by the compensation layer.

When the conventional reflection type liquid crystal display using the single polarization plate and the quarter wavelength plate allows the circularly polarized light to enter the liquid crystal layer, while working as a normally white element, the birefringence effect may be lost because the liquid crystal molecules rise in the direction of an electric field (substrate normal direction) due to the applied voltage, and the element changes to the dark state.

However, even when a voltage is applied, the liquid crystal molecules strongly fixed adjacent to the boundary of the substrate causes a slight birefringence effect, degrading the contrast ratio. On the other hand, when the twist angle of the liquid crystal layer is 90 degrees as described in the above background art, the remaining birefringence effects at the upper and lower substrates are cancelled, increasing the contrast ratio. Preferably, in consideration of the brightness and the cell gap margin under no voltage, the twist angle is below 80 degrees, and more preferably is 70 degrees, so that the brightness and the contrast ratio are incompatible.

Further, when a viewer looks at the conventional display obliquely, the retardation of the liquid crystal layer and the phase difference film is changed. That is, the display may be yellowish depending on the viewing angle, and this gives a user an unpleasant impression.

The technique disclosed in Japanese Patent Application, First Publication No. 10-232390 can produce achromatic images, whose colors may be changed depending on change in viewing angle, and this gives a user an unpleasant impression.

BRIEF SUMMARY OF THE INVENTION

It is therefore an object of the present invention to provide a reflection type liquid crystal display which can increase the contrast ratio and the brightness of images.

In order to accomplish the above object, a normally-white reflection type liquid crystal display comprising: a polarization plate; a quarter wavelength plate; a transparent substrate, a transparent electrode; and a twisted nematic liquid crystal layer, wherein the polarization plate, the quarter wavelength plate, the transparent substrate, the transparent electrode; and the twisted nematic liquid crystal layer are layered in sequence from a light inputting side, and an angle between the optical axis of the quarter wavelength plate and the transmission axis of the polarization plate is below 65 degrees and above 45 degrees, or below 45 degrees and above 25 degrees.

Preferably, the angle between the optical axis of the quarter wavelength plate and the transmission axis of the polarization plate is 39 to 43 degrees, or 47 to 51 degrees.

The twisted nematic liquid crystal layer is not limited to the liquid crystal layer whose twist angle is 90 degrees, and includes liquid crystal layers whose twist angle is 90 to 50 degrees. The normally white display allows transmission of light when no voltage is applied, and comprises one or more polarization plates.

The advantage of the present invention may be enhanced when the quarter wavelength plate is a wide band quarter wavelength plate with stacked uniaxial phase difference plates.

A twist angle of the liquid crystal layer is 60 to 85 degrees. Preferably, the twist angle of the liquid crystal layer is 68 to 74 degrees.

The product $\Delta nd$ of the anisotropy of the refractive index $\Delta n$ of the liquid crystal layer and the thickness of the liquid crystal layer d is 0.20 to 0.35 $\mu m$. Preferably, the product $\Delta nd$ of anisotropy of a refractive index $\Delta n$ of the liquid crystal layer and the thickness of the liquid crystal layer d is 0.24 to 0.31 $\mu m$. Under these conditions, the reflection type liquid crystal display can increase the contrast ratio and the brightness of images, and can reduce dependency on the cell gap and on the wavelength.

Preferably, the twist angle of the liquid crystal layer is approximately 70 degrees, and the value $\Delta nd$ is approximately 0.27 $\mu m$.

Because the angle between the optical axis of the quarter wavelength plate and the transmission axis of the polarization plate is below 65 degrees and above 45 degrees, or below 45 degrees and above 25 degrees, birefringence at the liquid crystal at the boundary of the substrate, which is caused by incompletely circularly polarized light entering the liquid crystal layer, can be compensated. Therefore, when a voltage is applied (in a light state), the reflectance of the display can be reduced, and the contrast is improved.

Because the product $\Delta nd$ of anisotropy of a refractive index $\Delta n$ of the liquid crystal layer and the thickness of the liquid crystal layer d is 0.24 to 0.31 $\mu m$, the contrast is remarkably improved even when brightness and the cell gap margin take precedence over other parameters in the design of displays. Thus, the present invention improves the brightness, the contrast ratio, and the cell gap margin.

In another aspect of the present invention, a reflection type liquid crystal display comprises: a polarization plate; a quarter wavelength plate with a half phase difference film and a quarter phase difference film; an upper substrate; a transparent electrode; a liquid crystal layer; a reflector electrode; and a lower substrate, wherein, the polarization plate, the quarter wavelength plate, the upper substrate, the transparent electrode, the liquid crystal layer, the reflector electrode, and the lower substrate are layered in sequence from a light inputting side, and assuming that the orientation direction of liquid crystal molecules adjacent to the upper substrate is zero degrees, and that a twist direction of the liquid crystal molecules from the upper substrate to the lower substrate is positive, the angle of the polarized light absorption axis of the polarization plate is 5 to 35 degrees, the angle of the optical axis of the half phase difference film is 15 to 15 degrees, and the angle of the optical axis of the quarter phase difference film is −75 to −45 degrees.

Preferably, the twist angle of the liquid crystal layer is 66 to 74 degrees, and the product of anisotropy of the refractive index of the liquid crystal layer and the thickness of the liquid crystal layer is 0.21 to 0.31 $\mu m$. The quarter wavelength plate may comprise a plurality of phase difference films.

The half phase difference film and the quarter phase difference film in the quarter wavelength plate are formed of polycarbonate high polymer or polysulphone high polymer.

The reflector electrode has irregularities on its surface. The liquid crystal layer includes twisted nematic liquid crystal molecules.

The liquid crystal display includes the polarization plate and the stacked quarter wavelength plate, and the angles of the polarization plate, the half wavelength phase difference film, and the quarter wavelength phase difference film are appropriately adjusted. Therefore, a change in retardation of a liquid crystal layer depending on a viewing angle is cancelled by the change in retardation of the phase difference films depending on the viewing angle. When no voltage is applied, the chroma of images does not exceed 20 within a viewing angle of ±60 degrees in all directions. Thus, the present invention prevents an undesirable change in color when a viewer looks at the display obliquely.

DETAILED DESCRIPTION OF THE INVENTION

The present invention will be explained in detail with reference to embodiments, sample calculation analysis, examples, and drawings.

First Embodiment

Figure 1:
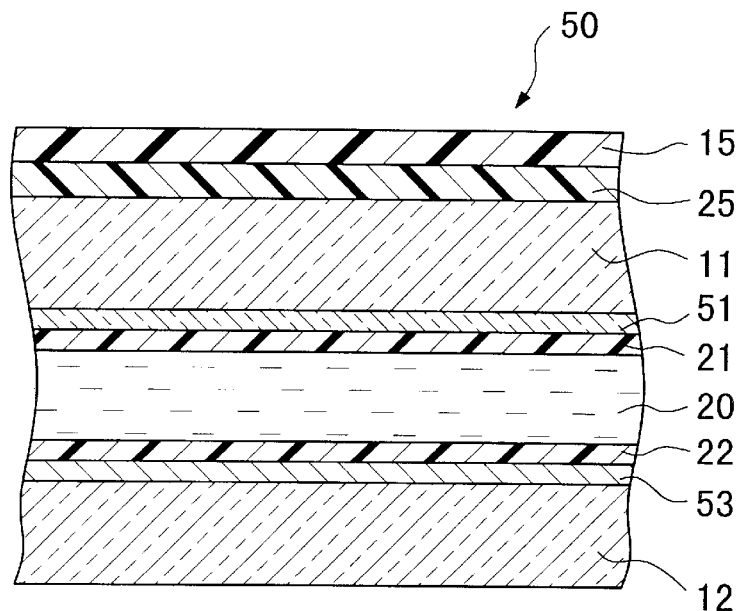
FIG. 1 is a cross-sectional side view showing the reflection type liquid crystal display of the first embodiment according to the present invention.

FIG. 1 is a cross-sectional side view showing the reflection-type liquid crystal display of the first embodiment. The reflection-type liquid crystal display 50 is a normally white type liquid crystal device, in which a polarization plate 15, a quarter wavelength plate 25, a transparent upper substrate 11, a transparent electrode 51, an orientated film 21, a twisted nematic liquid crystal layer 20, an orientated film 22, a reflector electrode 53, and a transparent lower substrate 12 are layered in sequence from the light inputting side. The quarter wavelength plate 25 and the polarization plate 15 are attached to the light inputting side of the upper substrate 11, that is, the side of the upper substrate 11 opposite to the orientated film 21. The liquid crystal layer 20 includes twisted nematic liquid crystal. The quarter wavelength plate 25 may be a wide band quarter wavelength plate, which comprises, as disclosed in Japanese Patent Application, First Publication No. 5-100114, a plurality of phase difference plates which are laminated so that their optical axes intersect. The quarter wavelength plate is attached, forming a predetermined angle with respect to the polarization plate so as to convert linearly polarized light into circularly polarized light over a wide wavelength band.

Figure 2:
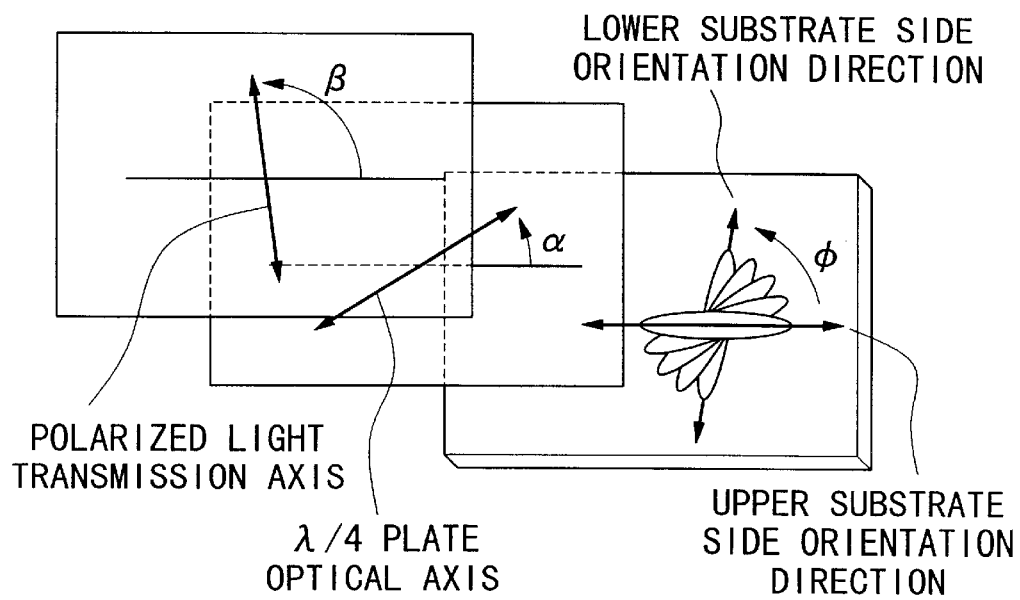
FIG. 2 is a diagram for explaining the angles of the quarter wavelength plate and the polarization plate of the present invention.

FIG. 2 shows angles of the quarter wavelength plate 25 and the polarization plate 15. With respect to the orientation direction relating the upper substrate, the optical axis of the quarter wavelength plate 25 has an angle α, and the polarization transmission axis of the polarization plate 15 has an angle β. The difference between the optical axis of the quarter wavelength plate 25 and the polarization transmission axis of the polarization plate 15, that is, the difference between α and β, is slightly changed from 45 degrees in the background art. The relative angle between the quarter wavelength plate and the polarization plate differs from the angle by which linearly polarized light is converted into circularly polarized light.

While in the background art circularly-polarized light is rotated to the right or to the left and enters the liquid crystal layer, incompletely circularly-polarized light enters the liquid crystal layer in the embodiment of the present invention. The influence of birefringence caused by the liquid crystal at the boundary of the substrate can be compensated, so that the reflectance is reduced when a voltage is applied (in a dark state), and this yields a remarkably improved high contrast.

The reflection-type liquid crystal display 50 may be a segment type, a simple matrix type, or an active matrix type liquid crystal display. Further, the device may be a monochromatic device or a color type device using a color filter.

The reflector electrode 52 may have a surface with slight irregularities which cause appropriate diffusion, eliminating the metallic impression from the display. When the reflector electrode 52 has a flat surface, a diffusion film may be provided between the upper substrate 11 and the quarter wavelength plate 25 to eliminate the metallic impression from the display.

Sample Calculation Analysis 1

In the sample calculation analysis 1, the twist angle of the liquid crystal layer is approximately 70 degrees, and the value of Δnd of the liquid crystal layer is approximately 0.27 μm in the reflection type liquid crystal display. The sample calculation analysis confirms that the reflection type liquid crystal display becomes brighter and reduces dependency on a cell gap and on wavelengths.

Figure 11:
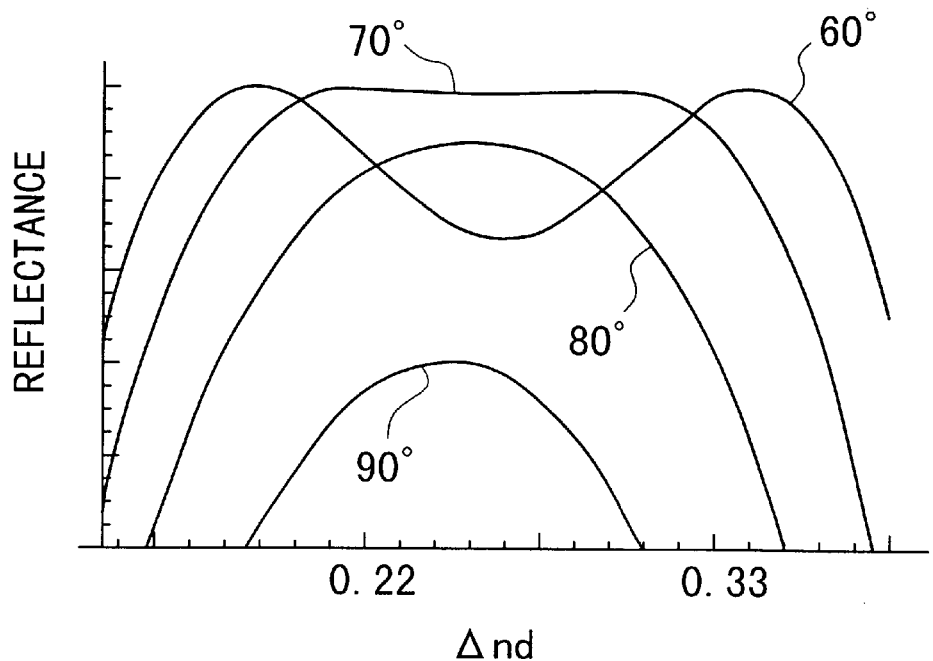
FIG. 11 is a graph showing the results of the sample calculation analysis 1 using a simulation, and for explaining the dependency of the reflectance on the twist angle and the value $\Delta nd$.

FIG. 11 is a graph showing curves which are calculated by changing the twist angle of the liquid crystal layer as a parameter when no voltage is applied and which represent the dependency of the reflectance on the Δnd of the liquid crystal layer. From the comparison of the maximum points, when the twist angle of the liquid crystal layer is set to below approximately 80 degrees, the reflectance is high. When the twist angle is 60 degrees, the reflectance has two maximum points at two value Δnds. When the twist angle is 70 degrees, the reflectance has two maximum points between which the concave portion of the curve (the decrease of the reflectance) is small and nearly flat. That is, when the twist angle is set to approximately 70 degrees and a cell gap design value is set in the range of the flat portion of the dependency curve, that is, when the value Δnd is 0.27 μm, the cell gap margin is maximum. Further, the wavelength dependency can be improved because the cell gap dependency is related to it.

In the background art, when the twist angle is approximately 70 degrees, the contrast is low, and the characteristics related to practical use may be degraded. The sample calculation analysis confirms that even when the twist angle is approximately 70 degrees, the contrast is high while the brightness and the cell gap margin are maintained by changing the position of the quarter wavelength plate relative to the polarization plate.

Sample Calculation Analysis 2

Figure 3:
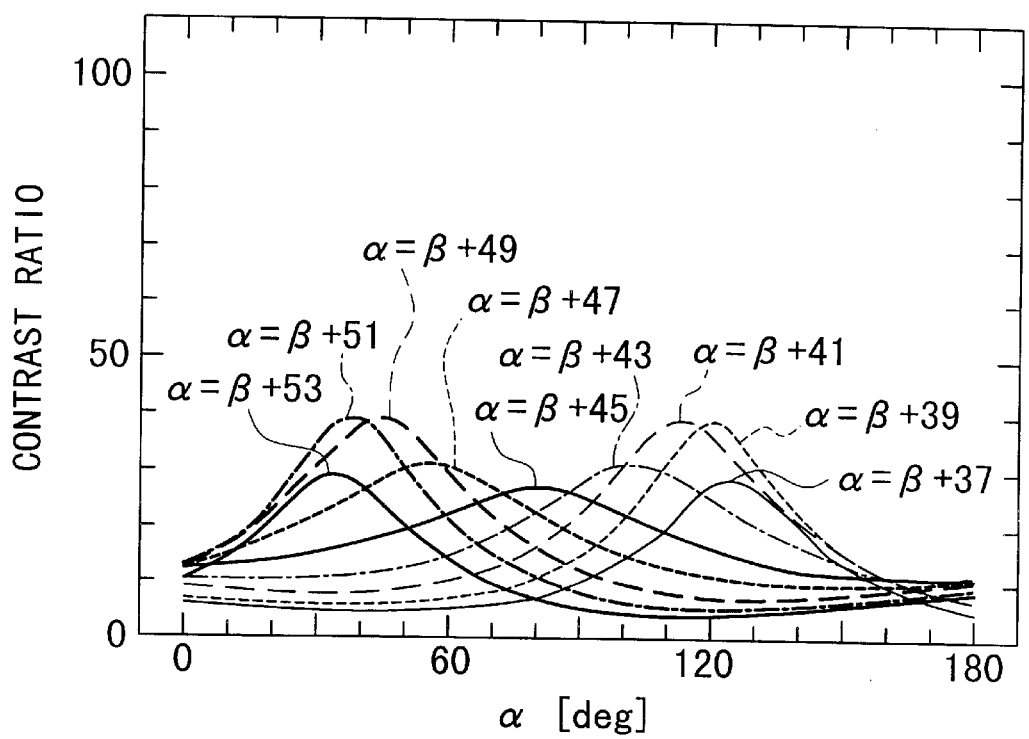
FIG. 3 is a graph showing the result of the sample calculation analysis 2 using a simulation of the present invention.

FIG. 3 is a graph showing the contrast ratios of the reflection type liquid crystal display 50 obtained by computing using a simulation, when the twist angle of the liquid crystal layer is 70 degrees, the Δnd of the liquid crystal layer is 0.27 μm (the cell gap: 4.0 μm), the angle α of the quarter wavelength plate and the angle β of the polarization plate are continuously changed, and a voltage of 5 V is applied. In the computing using the simulation, the anisotropy of the refractive index of the quarter wavelength plate is set to a value which is assumed by a uniaxially stretched film, in consideration of the wavelength dependency. The wavelength dependency of the anisotropy of the refractive index of the liquid crystal layer is assumed by a standard nematic liquid crystal element.

As obviously from FIG. 3, as compared with the prior reflection type liquid crystal display in which the α is β+45 degrees, the contrast ratio is improved when this angle is changed. Preferably, the angle may be increased or decreased by 2 to 6 degrees from the angle (α=β+45 degrees).

Sample Calculation Analysis 3

The sample calculation analysis 3 shows evaluations by computing using a simulation when a laminated wide band quarter wavelength plate is used as the quarter wavelength plate, in which other conditions are identical to those in the sample calculation analysis 1.

Figure 4:
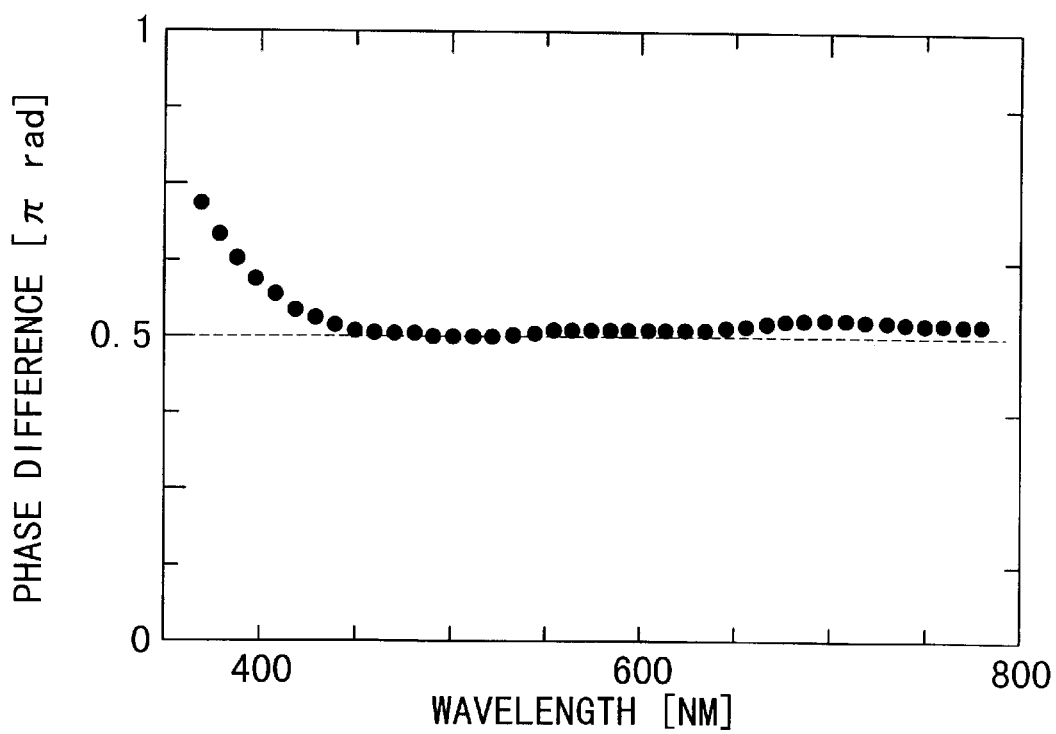
FIG. 4 is a graph showing the dependency of the phase difference on the wavelength obtained by the wide band frequency film in the sample calculation analysis 3 of the present invention.
Figure 5:
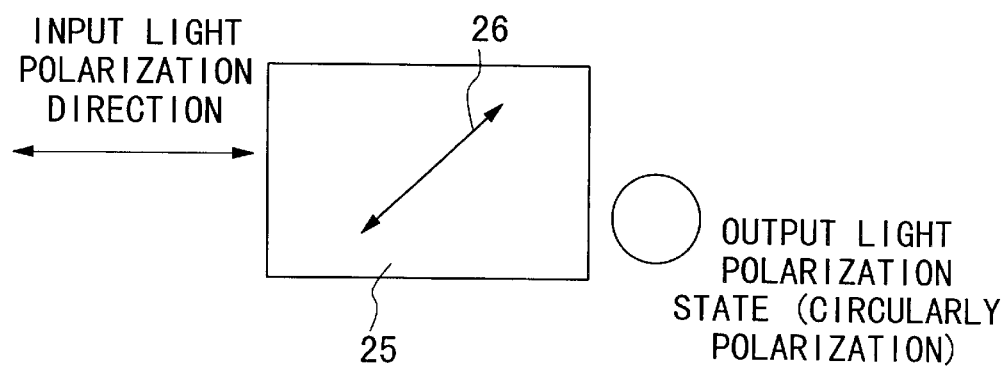
FIG. 5 is a diagram for explaining the optical axis of the wide band quarter wavelength plate used in the sample calculation analysis 3.

The wide band quarter wavelength plate assumed in the computing simulation in the sample calculation analysis is "Wide Band Wavelength Film", the product supplied by Nitto Denko Co. Ltd., in which two uniaxially stretched polycarbonate films are laminated. FIG. 4 is a graph showing wavelength dependency of phase differences obtained from the "Wide Band Wavelength Film" made by Nitto Denko Co. Ltd. As shown in FIG. 4, the phase differences of π/2 are obtained over the range of visible light, that is, linearly polarized light is converted into circularly polarized light. The wide band quarter wavelength plate has a laminate structure, by which the optical axis cannot be strictly defined. In the sample calculation example, when linearly polarized incident light is converted into circularly polarized light, a direction of 45 degrees with respect to the polarization direction of the linearly polarized incident light is defined as the optical axis 26 for convenience (FIG. 5).

Figure 6:
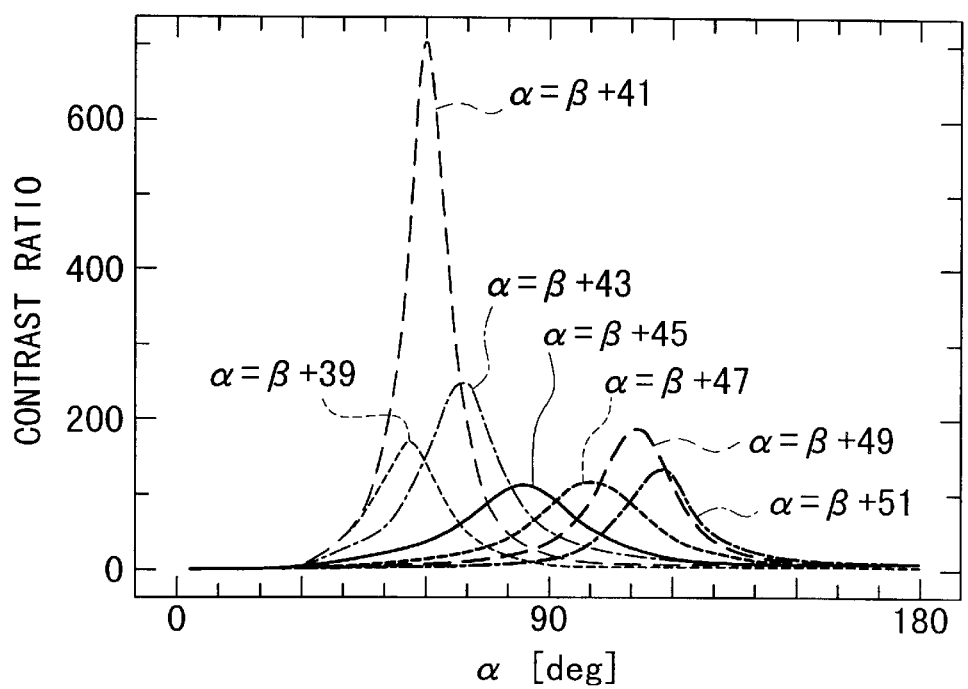
FIG. 6 is graph showing the results of the sample calculation analysis 3 using a simulation of the present invention.

In the sample calculation analysis, the contrast ratios are calculated in a manner identical to the sample calculation analysis 2, when the twist angle of the liquid crystal layer is 70 degrees, the Δnd of the liquid crystal layer is 0.27 μm (cell gap: 4.0 μm), the angle α of the quarter wavelength plate and the angle β of the polarization plate are continuously changed, and a voltage of 5 V is applied. FIG. 6 is a graph showing the results of the simulation in which the wide band wavelength plate is assumed. This simulation confirms that, as compared with the prior structure in which the angle is set to α=β+45 degrees, the contrast ratio is improved when this angle is changed (FIG. 6) in a fashion identical to the sample calculation analysis 2. Preferably, the angle may be increased or decreased by 2 to 6 degrees from the angle of α=β+45 degrees.

As compared with the results of examples which use the normal quarter wavelength plate (FIG. 3), the contrast ratio can be increased because of the wide band quarter wavelength plate.

Sample Calculation Analysis 4

In the sample calculation analysis 4, the contrast ratios are calculated when the twist angle of the liquid crystal layer is 68 degrees, the angle α of the quarter wavelength plate and the angle β of the polarization plate are changed, and a voltage of 5 V is applied. Except for the twist angle, the other conditions are identical to the sample calculation analysis 3.

Figure 7:
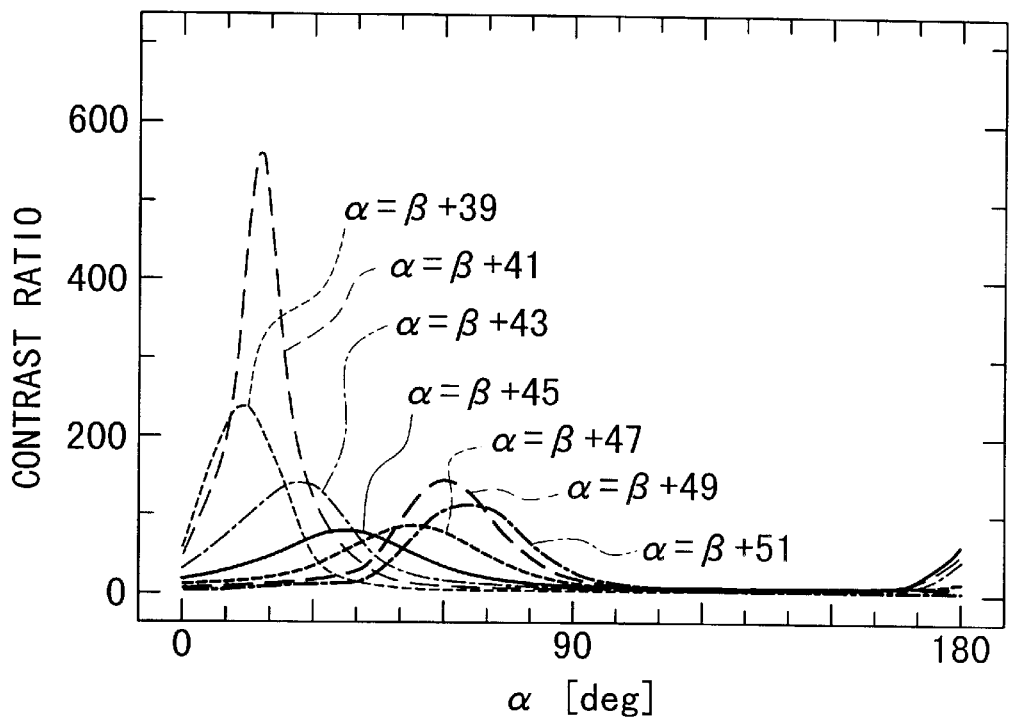
FIG. 7 is a graph showing the results of the sample calculation analysis 4 using a simulation of the present invention.

FIG. 7 is a graph showing the results obtained by the above simulation. As compared with the prior reflection type liquid crystal display in which the angle is α=β+45 degrees, when this angle is changed, the contrast ratio is improved.

Figure 8:
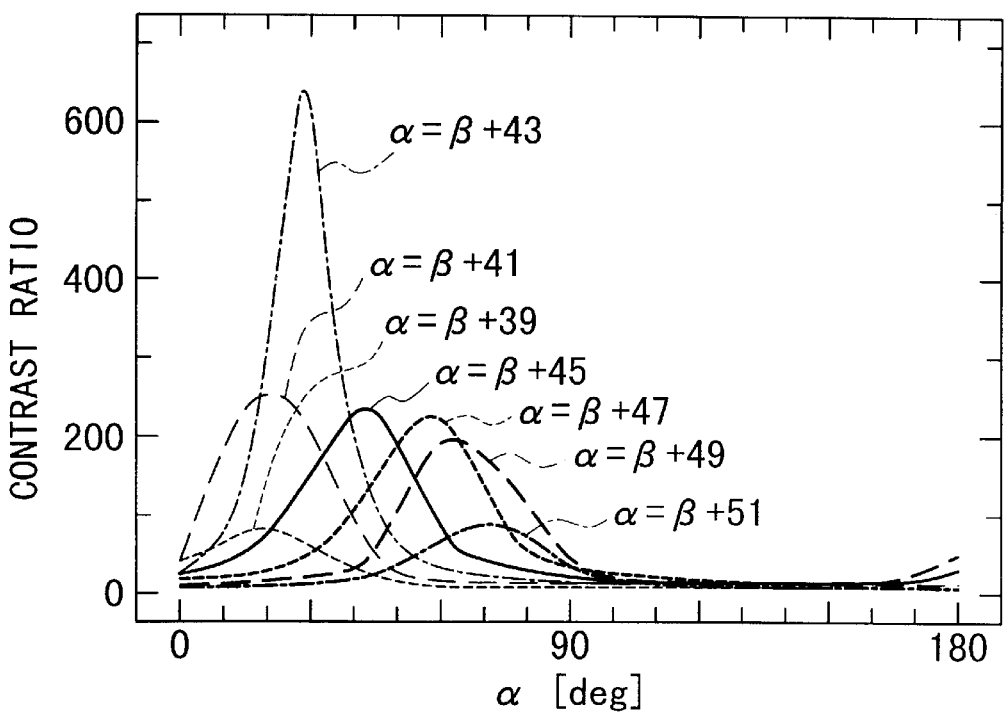
FIG. 8 is a graph showing the other results of the sample calculation analysis 4 using a simulation of the present invention.

Further, the contrast ratio is calculated when the twist angle of the liquid crystal layer is 74 degrees, the angle α of the quarter wavelength plate and the angle β of the polarization plate are changed, and a voltage of 5 V is applied. Except for the twist angle of the liquid crystal layer, the other conditions are identical to those of the sample calculation analysis 3. The results of this simulation are shown in the graph of FIG. 8. As is obvious from FIG. 8, as compared with the prior device in which the angle is set to α=β+45 degrees, the contrast ratio is improved when this angle is changed.

Based on the sample calculation analysis 1 to 4, the reflection type liquid crystal display of the present invention will be specifically described in examples.

EXAMPLE 1

In the example 1, the reflection type liquid crystal display is constructed according to the following parameters:

the twist angle of the liquid crystal layer: 70 degrees

Δnd of the liquid crystal layer: 0.27 μm (cell gap: 4.0 μm)

the angle α of the quarter wavelength plate: 61 degrees the angle β of the polarization plate: 20 degrees (α=β+41 degrees)

The quarter wavelength plate is the wide band quarter wavelength plate in which two films are laminated, made by Nitto Denko Co. Ltd.

The reflectance to a voltage is measured. The reflectance is 40 percent when no voltage is applied, and the contrast ratio is 40 when the voltage of 5 V is applied.

COMPARATIVE EXAMPLE 1 TO EXAMPLE 1

Except that the angle α of the quarter wavelength plate is 65 degrees (α=β+45 degrees), the reflection type liquid crystal display of the comparative example 1 is identical to the device of example 1.

The reflectance to a voltage is measured. The reflectance is 40 percent when no voltage is applied, and the contrast ratio is 15, which is much lower than the value of the example 1 when the voltage of 5 V is applied.

COMPARATIVE EXAMPLE 2 TO EXAMPLE 1

In the comparative example 2, the reflection type liquid crystal display of FIG. 1 is constructed according to the following parameters:

the twist angle of the liquid crystal layer: 90 degrees

Δnd of the liquid crystal layer: 0.24 μm (cell gap: 3.5 μm)

the angle α of the quarter wavelength plate: 65 degrees the angle β of the polarization plate: 20 degrees (α=β+45 degrees)

Except for the above parameters, the comparative example 2 is identical to the example 1.

The reflectance to a voltage is measured. The reflectance is 32 percent when no voltage is applied, and the contrast ratio is 35 when the voltage of 5 V is applied. Both results are lower than those of the example 1.

EXAMPLE 2

As the example 2, three reflection type liquid crystal displays with the cell gaps of 3.5 μm, 4.0 μm, and 4.5 μm, respectively, are manufactured. The values Δnd of the liquid crystal layer are 0.24 μm, 0.27 μm, and 0.31 μm, depending on the cell gaps. Except for these structures, the example 2 is identical to the example 1.

When the liquid crystal displays are switched from the bright state to the dark state, the present inventors cannot find any differences due to the different cell gaps at all from visual observation.

In the recent technique of mass production for the liquid crystal display, precision in setting the cell gap is within approximately ±0.3 μm, which range is narrower than the range of the change in cell gap in the examples 2. Therefore, the liquid crystal display designed according to the parameters in the example 1 has a very wide cell gap margin.

COMPARATIVE EXAMPLE 3 TO EXAMPLES 1 AND 2

In the comparative example 3, according to the parameters disclosed in Japanese Patent Application, First Publication No. 4-116515, the twist angle is 63 degrees, the angle α of the quarter wavelength plate is 45 degrees, and the angle β of the polarization plate is zero. As the comparative examples, three reflection type liquid crystal displays whose cell gaps are 2.5 μm, 3.0 μm, and 3.5 μm are manufactured. The values Δnd of the liquid crystal layers are 0.17 μm, 0.20 μm, and 0.24 μm, respectively. Except for these features, the comparative examples are identical to the reflection type liquid crystal device of the example 1. When the liquid crystal displays of the comparative examples are switched from the bright state to the dark state, the present inventors detects differences in brightness and color due to the different cell gaps from visual observation.

EXAMPLE 3

Figure 9:
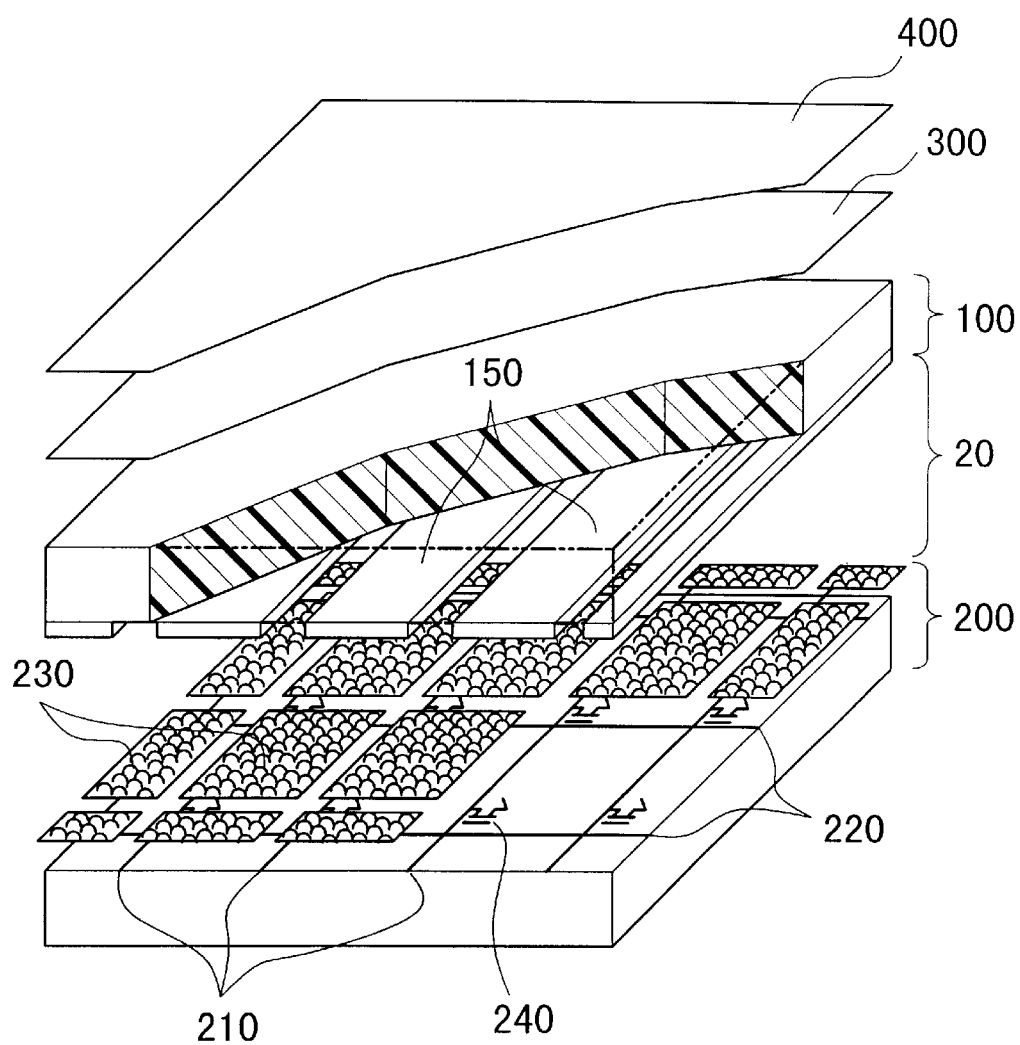
FIG. 9 is a perspective view showing the reflection type liquid crystal display of the example 3 of the present invention.

The example is a 6.1-inch reflection type liquid crystal display with 640×800 pixels and an active matrix, is able to produce color images (reflection type color LCD). FIG. 9 is an exploded view showing the structure of the reflection type liquid crystal display. The liquid crystal device has an active matrix substrate 200 and a color filter substrate 100 between which the liquid crystal layer 20 is provided.

The active matrix substrate 200 has reflector electrodes formed on the matrix, and the reflector electrodes are connected to drains of thin film transistors (TFT). Gates of the TFT are connected to gate bus lines 220, while sources of the TFT are connected to signal bus lines 210. Pixel electrodes 230 have surfaces with slight irregularities for diffusing and reflecting incident light.

The color filter substrate has stripes in which color layers 150 of red, green, and blue correspond to the pixel electrodes on the active matrix. Orientated films (not shown) made of polyimide resin are provided on the inside surfaces (in contact with the liquid crystal layer) of the color filter substrate 100 and of the active matrix substrate 200. The orientated films are manufactured by a rubbing process for orientating the liquid crystal in one predetermined direction.

The quarter wavelength plate 300 is laminated on the side of the color filter substrate 100, which is the side opposite to the orientated film, and the polarization plate 400 is laminated on the quarter wavelength plate 300.

Figure 10:
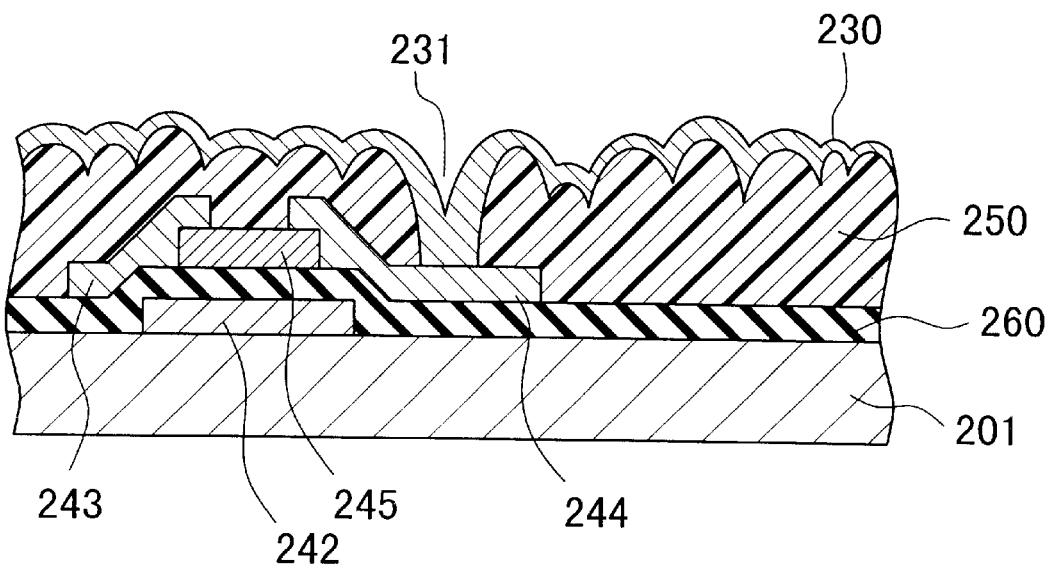
FIG. 10 is a cross-sectional side view showing a TFT and a pixel electrode on an active matrix substrate of the example 3 of the present invention.

FIG. 10 is a cross-sectional view showing the structure of the TFT in the active matrix substrate and the pixel electrode. The active matrix comprises a chrome gate terminal 242 on a substrate 201, a insulating layer 260 covering the gate terminal, a channel layer 245 of amorphous silicon which is an "island" on the insulating layer 260, source terminal 243 and chrome drain terminal 244 made of chrome and connected to the channel layer, a resin layer 250 on the source and drain terminals, and a reflector electrode 230 on the resin layer 250. The reflector electrode 230 is made of aluminum, and is insulated from the lower portion by the resin layer 250 except for a contact portion 231, which is connected to the drain terminal 244.

To manufacture the reflection type liquid crystal display, the parameters such as the twist angle of the liquid crystal layer, the Δnd of the liquid crystal layer, the angle α of the quarter wavelength plate, and the angle β of the polarization plate are set to the same values as the example 1.

The liquid crystal display of this example can produce bright and uniform full-color images with a high contrast ratio.

Second Embodiment

Figure 12:
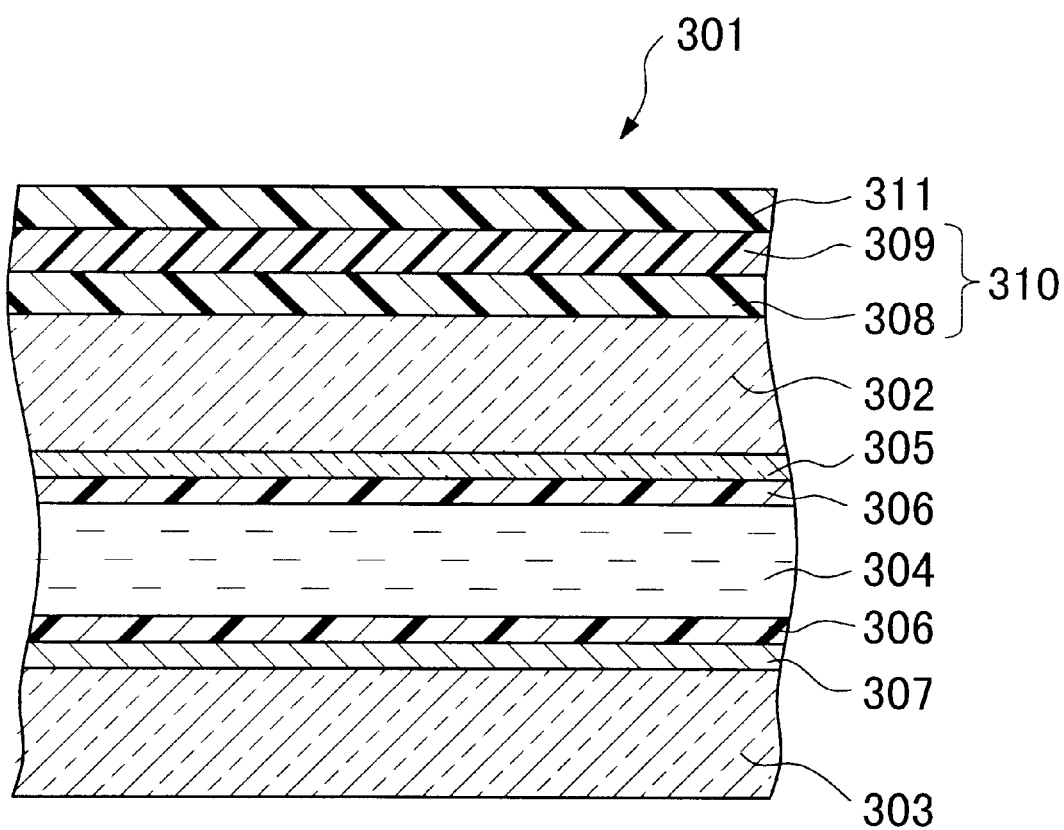
FIG. 12 is a cross-sectional side view showing the reflection type liquid crystal display of the second embodiment according to the present invention.

In the following, the second embodiment of the present invention will be explained with reference to figures. FIG. 12 is a cross-sectional side view showing the reflection type liquid crystal display of the second embodiment. FIG. 12 is a schematic diagram showing orientation of liquid crystal and angles of a polarization plate, a half phase difference film, and a quarter wavelength phase difference film.

The reflection type liquid crystal display 301 of the second embodiment has a upper substrate 302 on which a transparent electrode 305 and an orientated film 306 are layered, and an lower substrate 303 on which a reflector electrode 307 and another orientated film 306 are layered. The orientated films 306 face each other through a liquid crystal layer with TN liquid crystal provided between the upper substrate 302 and the lower substrate 303.

The laminated quarter wavelength plate 310 and the polarization plate 311 are layered on the side of the upper substrate 302 which is not in contact with the liquid crystal layer 304. The laminated quarter wavelength plate 310 comprises a half wavelength phase difference film 309 and a quarter wavelength phase difference film 308; the half wavelength phase difference film 309 is a stretched film which generates a phase difference of a half wavelength between input and output monochromatic light, and the quarter wavelength phase difference film 308 is a stretched film which generates a quarter wavelength between input and output monochromatic light.

The reflection type liquid crystal display 301 is a normally-white element which is in a white state when no voltage is applied. The polarization plate 311 and the laminated quarter wavelength plate 310 convert the incident light passing therethrough into circularly polarized light or approximately circularly polarized light, which enters the liquid crystal layer 304. The transparent electrode 305 generates an electric field in the liquid crystal layer 304 to change the direction of the liquid crystal molecules, so that the incident light is reflected by the reflector electrode 307 and the intensity of the light visible to a user is changed.

While in the embodiment the display includes the half wavelength phase difference film 309 and the quarter wavelength phase difference film 308, the present invention is not limited to the embodiment, and three or more stretched films may be laminated. The stretched films may be formed of polycarbonate high polymer or polysulphone high polymer.

Figure 13:
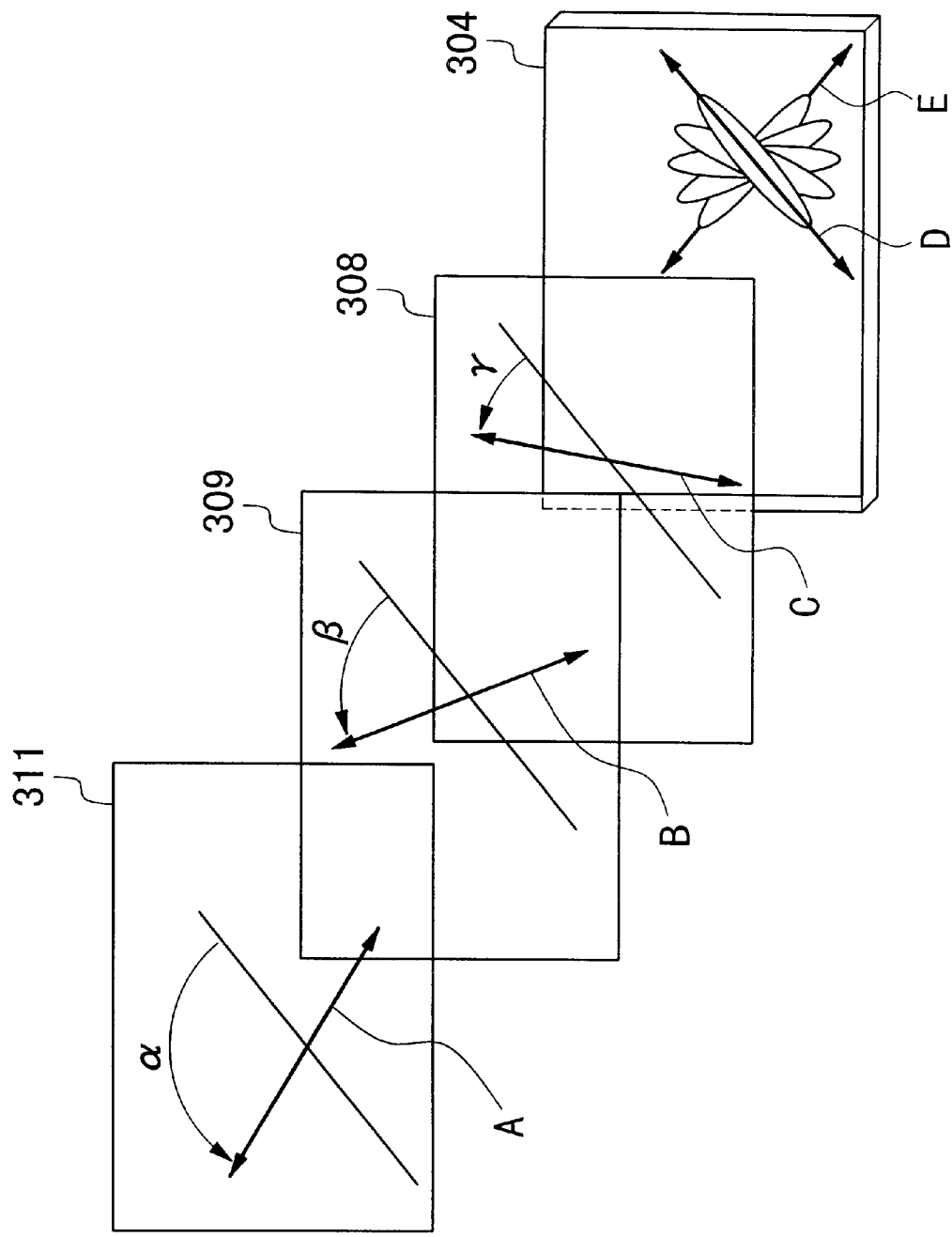
FIG. 13 is a schematic diagram showing the orientation of the liquid crystal molecules and the angles of the polarization plate, a half wavelength phase difference film, and a quarter wavelength phase difference film in the present invention.

As shown in FIG. 13, the alignment of the liquid crystal molecules in the liquid crystal layer 304 is affected by the orientation directions of the upper and lower substrates 302 and 303 with respect to the orientated film 306, and are twisted continuously from the boundary of the upper substrate 302 to the boundary of the lower substrate 303. In FIG. 13, reference character D represents the orientation direction of the liquid crystal layer 304 adjacent to the upper substrate as zero degree (reference angle), reference character E represents the orientation direction of the liquid crystal layer 304 adjacent to the lower substrate, and the twist direction from the upper substrate 302 to lower substrate 303 is assumed to be positive. The polarized light absorption axis A of the polarization plate 311 is set at an angle α, the optical axis B of the half wavelength phase difference film 308 is set at an angle β, and the optical axis C of the quarter wavelength phase difference film 309 is set at an angle γ.

To convert the incident light passing through the polarization plate 311, the half wavelength phase difference film 309, and the quarter wavelength phase difference film 308, into the circularly polarized light or approximately circularly polarized light, the angles α, β, and γ are set according to the formula:

$$\gamma - \alpha = 2(\beta - \alpha) \pm 45 \text{ degrees} \qquad \text{[formula 1]}$$

However, even when the incident light enters the liquid crystal layer 304 whose combination of the angles α, β, and γ satisfy the above formula, the retardation caused by the liquid crystal layer 304, the half wavelength phase difference film 309, and the quarter wavelength phase difference film 308 is seemingly changed when a viewer looks at the device obliquely. Therefore, the color tone of the display may be yellowish or bluish depending on the view angle. In particular, the yellowish color of the display gives a user an unpleasant impression. In innumerable combinations satisfying the above formula, conditions required to produce the circularly polarized light all over the visible frequency range depend on materials of the half wavelength phase difference film 309 and the quarter wavelength phase difference film 308. That is, the conditions depend on wavelength dependency (wavelength dispersion characteristics) of refractive indexes of the materials. Therefore, even when the reflection type liquid crystal display 301 has excellent wide band characteristics, displayed colors may be seemingly changed when a viewer looks at the display obliquely.

The angles α, β, and γ are optimized in the present invention, so that the change in retardation of the liquid crystal layer 304 due to the change in view angle are cancelled by the changes in retardation of the half wavelength phase difference film 309 and the quarter wavelength phase difference film 308. When no voltage is applied, chroma (a value C* in a L*a*b* co-ordinates) does not exceed 20 within an angle of ±60 degrees in all directions. Under these conditions, the present invention solves the problem that displayed colors appear to change to the viewer depending on the viewing angle.

When the twist angle of the liquid crystal layer 304 is approximately 70 degrees and the value Δnd of the liquid crystal layer 304 is approximately 0.27 μm, the reflection type liquid crystal display 301 prevent the undesirable change in color due to the viewing angle. The twist angle has a tolerance of ±4 degrees, and the value Δnd has ±0.4 μm. That is, the twist angle of the liquid crystal layer 304 can be set from 66 degrees to 74 degrees, while the Δnd of the liquid crystal layer 304 can be set from 0.21 μm to 0.31 μm.

In addition, when the angle α is set from 5 to 35 degrees, the angle β is set from −15 to 15 degrees, and the angle γ is set from −75 to −45 degrees, the chroma of the displayed colors does not exceed 20 within a viewing angle of 60 degrees in all directions. Thus, the present invention solves the problem that the displayed colors appear to change to the viewer depending on the viewing angle.

The reflection type liquid crystal display 1 may be a segment device, a simple matrix device, or an active matrix device, and may be a monochromatic device or a color type device using a color filter.

The reflector electrode 307 may have small irregularities on its surface. The irregularities causes dispersion of the cell gaps, whose average value is set to the desired cell gaps, and causes appropriate diffusion, eliminating the metallic impression from the display. When the surface of the reflector electrode 307 is flat, a diffusion film may be provided between the upper substrate 302 and the quarter wavelength plate 310 to eliminate the metallic impression from the display.

Sample Calculation Analysis 5

Figure 14:
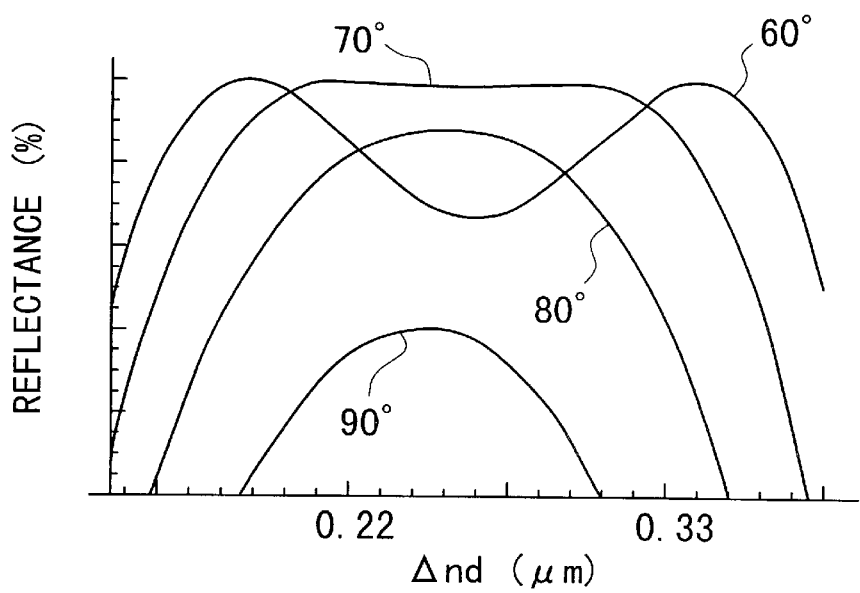
FIG. 14 is a graph showing the curve corresponding to the dependency of the reflectance on the value $\Delta nd$ of the liquid crystal layer.

In the sample calculation analysis 5 for the second embodiment, the twist angle of the liquid crystal layer is approximately 70 degrees, and the value of Δnd of the liquid crystal layer is approximately 0.27 μm in the reflection type liquid crystal display. The sample calculation analysis 5 shows that the reflection type liquid crystal display satisfying the above conditions prevents any undesirable change in color. In FIG. 14, the ordinate represents the reflectance, and the abscissa represents the value Δnd. FIG. 14 is a graph showing curves which are calculated by changing the twist angle of the liquid crystal layer as a parameter when no voltage is applied and which represent the dependency of the reflectance on the value Δnd of the liquid crystal layer.

From the comparison of the maximum points, when the twist angle of the liquid crystal layer is set to below approximately 80 degrees, the reflectance is high. When the twist angle is 60 degrees, the reflectance has two maximum points at two values of Δnd. When the twist angle is 70 degrees, the reflectance has two maximum points, between which the concave portion of the curve (the decrease in the reflectance) is small and nearly flat. Therefore, the twist angle is set to approximately 70 degrees, and a cell gap design value is set in the range of the flat portion of the dependency curve. That is, when the value Δnd is approximately 0.27 μm, the dependency of the reflectance of the liquid crystal layer 304 on the value Δnd is minimum. Further, a wavelength dependency can be improved because the dependency on the value Δnd is related to a wavelength dependency. That is, the display prevents any undesirable change in color. From the sample calculation example, when the twist angle of the liquid crystal layer 304 is approximately 70 degrees and the value Δnd of the liquid crystal layer 304 is approximately 0.27 μm, the display prevents any undesirable change in color. Further, as obvious from FIG. 14, when the value Δnd of the liquid crystal layer 4 is from 0.21 to 0.31 μm, the reflectance is high, and the dependency of the value Δnd on the reflectance is small.

Sample Calculation Analysis 6

In the sample calculation analysis 6 for the reflection type liquid crystal display of the second embodiment, when the angle α of the polarization plate 311, the angle β of the half wavelength phase difference film 309, and the angle γ of the quarter wavelength phase difference film 308 are changed as parameters, and when no voltage is applied, the chroma (C*) on the display is computed using a simulation. The twist angle of the liquid crystal layer 304 is 70 degrees, and the value Δnd of the liquid crystal layer 304 is 0.27 μm (cell gap: 4.0 μm).

The half wavelength phase difference film 309 is a stretched film made from polycarbonate, which generates a phase difference of a half wavelength (approximately 275 nm) between input and output monochromatic light with wavelengths of 550 nm. The quarter wavelength phase difference film 8 is a polycarbonate high polymer stretched film which generates a phase difference of a quarter wavelength (approximately 138 nm) between the input and output monochromatic light with wavelengths of 550 nm.

The liquid crystal display, in which the polycarbonate high polymer is used in the half wavelength phase difference film 309 and the quarter wavelength phase difference film 308, must satisfy one of the following formulae:

$$\beta = \alpha - 17.5 \text{ degrees}, \gamma = \alpha - 80 \text{ degrees} \quad \text{[formula 2]}$$

$$\beta = \alpha + 17.5 \text{ degrees}, \gamma = \alpha + 80 \text{ degrees} \quad \text{[formula 3]}$$

$$\beta = \alpha + 72.5 \text{ degrees}, \gamma = \alpha + 10 \text{ degrees} \quad \text{[formula 4]}$$

$$\beta = \alpha - 72.5 \text{ degrees}, \gamma = \alpha - 10 \text{ degrees} \quad \text{[formula 5]}$$

When the display satisfies the above formulae, the incident light, which has passed through the polarization plate 311, the half wavelength phase difference film 309, and the quarter wavelength phase difference film 308, is converted into the circularly polarized light over the entire visible frequency range.

Figure 15:
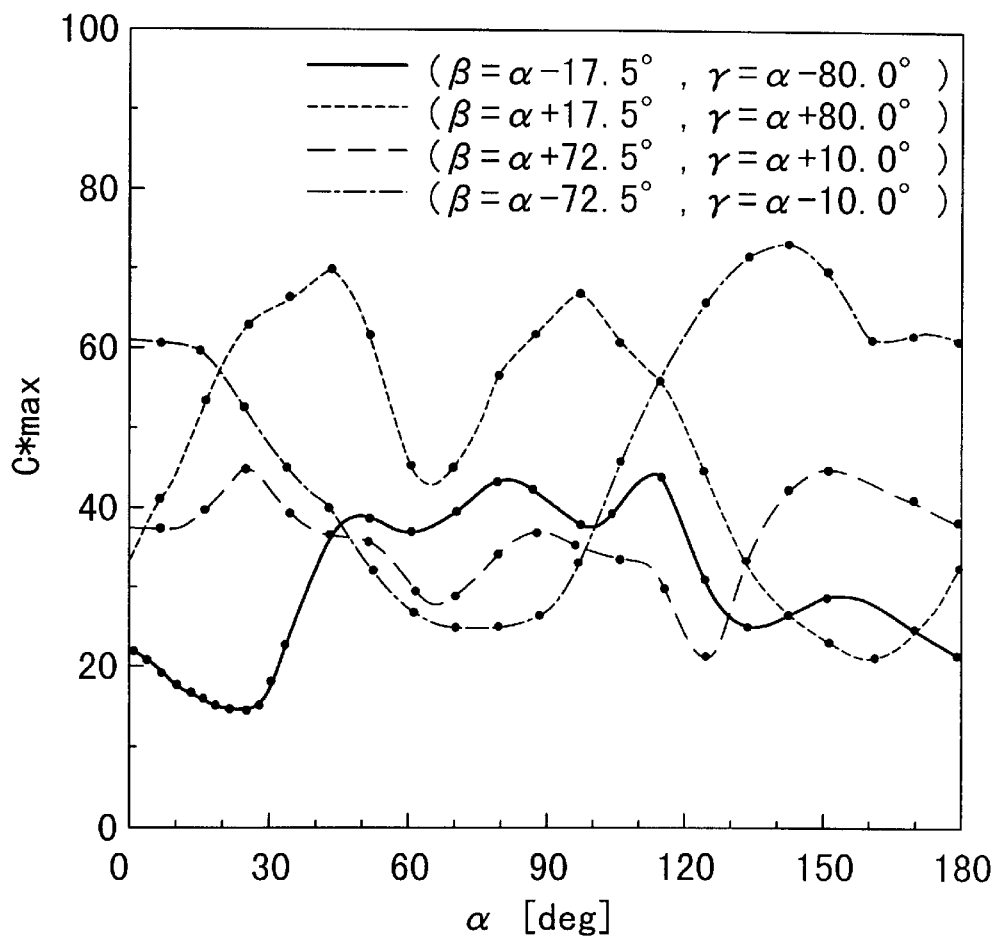
FIG. 15 is a graph showing the results of the simulation for the angles α, β, and γ.

In FIG. 15, the ordinate represents the maximum value C*max of the chroma of displayed colors within a viewing angle of 60 degrees in all directions, and the abscissa represents the angle α. FIG. 15 is a graph showing the results of computing using a simulation for various combinations of α, β, and γ satisfying the above formulas 2–5. In FIG. 15, the solid line corresponds to the formula 2, the dotted line corresponds to the formula 3, the broken line corresponds to the formula 4, and the alternate long and short dash line corresponds to the formula 5. The reflectance of the incident light from the reflector electrode 307 is assumed to be mirror reflection of 100%. A light source is a D65 source defined in JIS (Japanese Industrial Standard) Z872. In the simulation, reflection by the surface of the reflection type liquid crystal display is ignored.

Figure 16:
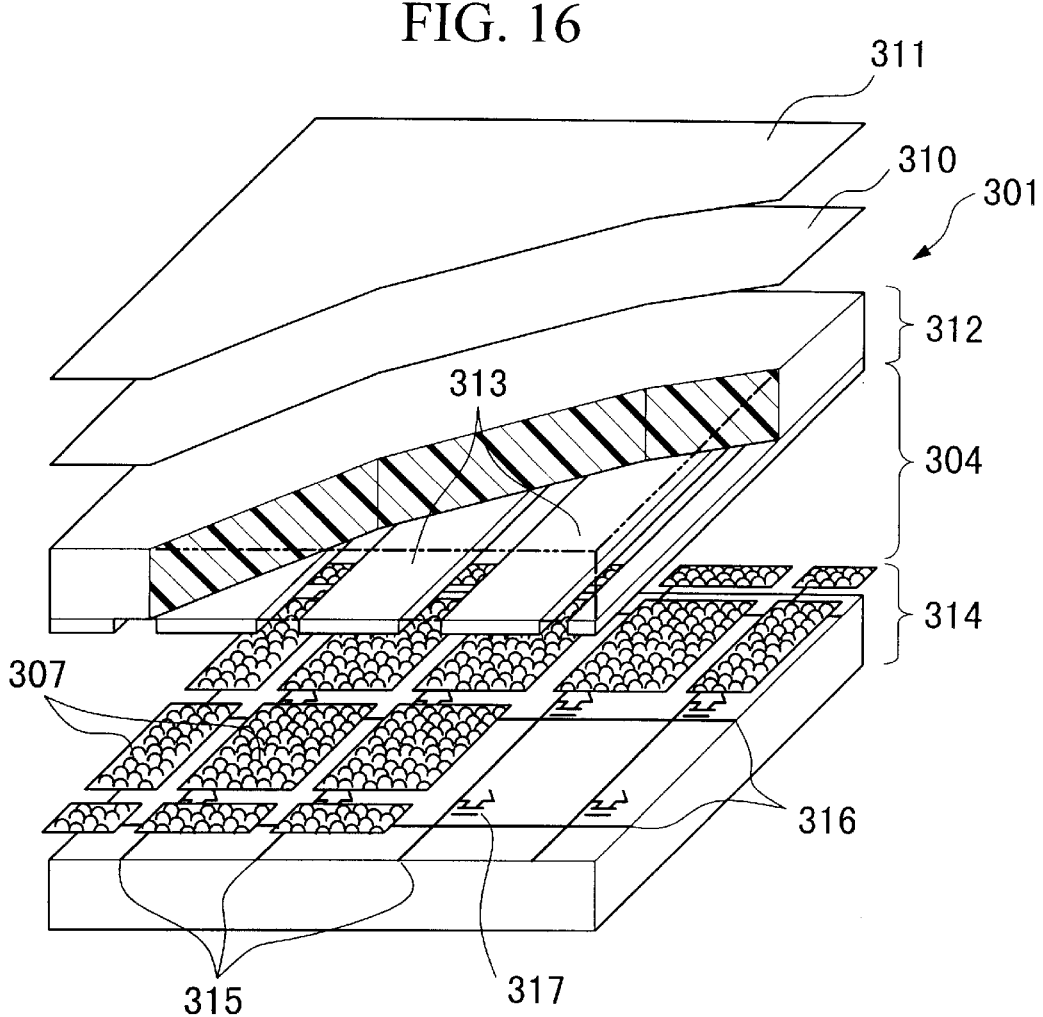
FIG. 16 is a partial cross-sectional perspective view showing the reflection type liquid crystal display of the third embodiment according to the present invention.
Figure 17:
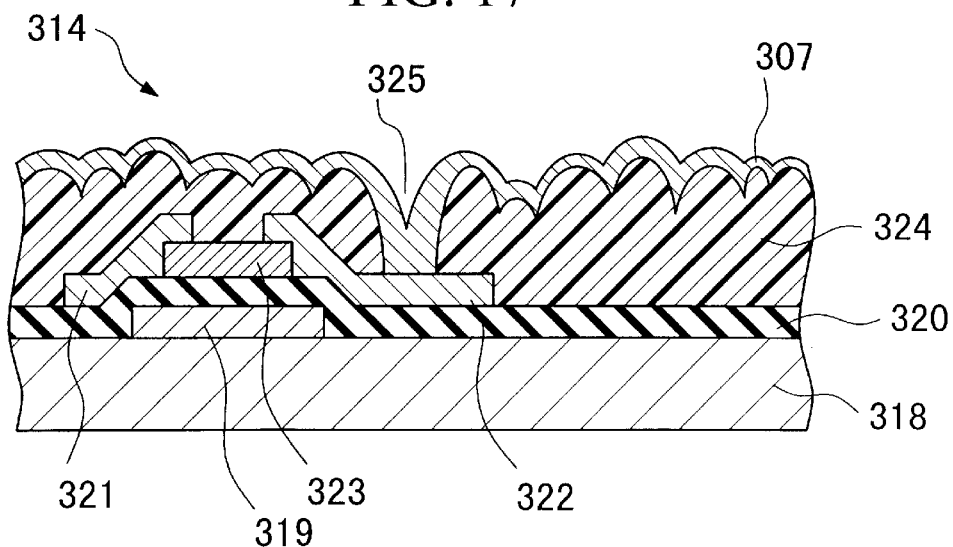
FIG. 17 is a cross-sectional side view showing a TFT and a pixel elected on an active matrix substrate of the third embodiment of the present invention.

When the angle α is from approximately 5 to 35 in the formula 2, that is, when the angle α is from 5 to 35 degrees, the angle β is from –15 to 15 degrees, and the angle γ is from –75 to –45 degrees, the chroma of the displayed colors within a viewing angle of 60 degrees in all directions does not exceed 20. Under these conditions, any undesirable change in color depending on the viewing angle, which is the problem in the prior art, can be prevented. According to the sample calculation analysis 6, the present invention prevents any undesirable change in color when the twist angle of the liquid crystal layer 304 is approximately 70 degrees, the value Δnd of the liquid crystal layer 304 is approximately 0.27 μm, the angle α is from 5 to 35 degrees, the angle β is from –15 to 15 degrees, and the angle γ is from –75 to –45 degrees Third Embodiment The third embodiment of the present invention will be explained with reference to FIG. 16. In FIG. 16, the same reference numerals will denote the parts previously described in FIG. 12, and detailed descriptions will be omitted. FIG. 16 is a partial cross-sectional view showing the structure of the reflection type liquid crystal display of the third embodiment. FIG. 17 is a cross sectional side view showing a TFT and a pixel electrode on an active matrix substrate in the reflection type liquid crystal display of the third embodiment.

The reflection type liquid crystal display of the second embodiment is a 6.1-inch reflection type liquid crystal display with 640×800 pixels and an active matrix, and can produce color images (reflection type color LCD). Except that the active matrix substrate 314 and the color filter substrate 312 face each other, and that the liquid crystal layer 304 is provided between them, the third embodiment is identical to the second embodiment.

As shown in FIGS. 16 and 17, the reflector electrodes 307 are provided on the active matrix substrate 314, forming a matrix. A gate electrode 319 formed from chrome is provided on a substrate 318. Between the gate electrode 319 and the substrate 318, an insulating film 320 is provided. A source 321 and a drain 322 are formed on the insulating film 320, and a channel layer 323 of, for example, amorphous silicon forms an "island" between the gate 321 and the drain 322. A resin layer 324 covers the insulating layer 320, and the reflector electrode 307 of, for example, aluminum is formed on the resin layer 324. The reflector electrode 307 includes a contact portion which reaches the drain 322. Except for the contact portion 325, the reflector electrode 307 is insulated from the lower structure by the resin layer 324.

The reflector electrodes 307 are connected to drains of thin film transistors 317 (hereinafter referred to as "TFT").

The gate electrodes 319 of the TFT 317 are connected to a gate bus line 316, and the sources of the TFT 317 are connected to a signal bus line 315. The reflector electrode 307 has small irregularities on their surfaces which diffuse the incident light.

The color filter substrate 312 includes color layers 313 of red, green, and blue, forming stripes, which correspond to the reflector electrodes 307 on the active matrix substrate 314. Orientated films (not shown) made of polyimide resin are provided on the inside surfaces (in contact with the liquid crystal layer 304) of the color filter substrate 312 and of the active matrix substrate 314. The orientated films are manufactured by a rubbing process which orientates the liquid crystal in one predetermined direction.

The quarter wavelength plate 310 and the polarization plate 311 are subsequently attached to the side opposite to the orientated film of the color filter substrate 312. The quarter wavelength plate 310 comprises a half wavelength phase difference film 309 and a quarter wavelength phase difference film 308, which are layered in sequence from the polarization plate 311.

To manufacture the reflection type liquid crystal display of the second embodiment, the parameters such as the twist angle of the liquid crystal layer, the value Δnd of the liquid crystal layer, the angle α of the polarization plate, the angle β of the half wavelength phase difference plate, and the angle γ of the quarter wavelength phase difference film are set to the same values as those in the second embodiment.

The liquid crystal display of the third embodiment can produce bright and uniform full-color images with the high contrast ratio, and prevents the images from becoming yellowish even when the viewing angle is changed in the light state.

EXAMPLE 4

Figure 18:
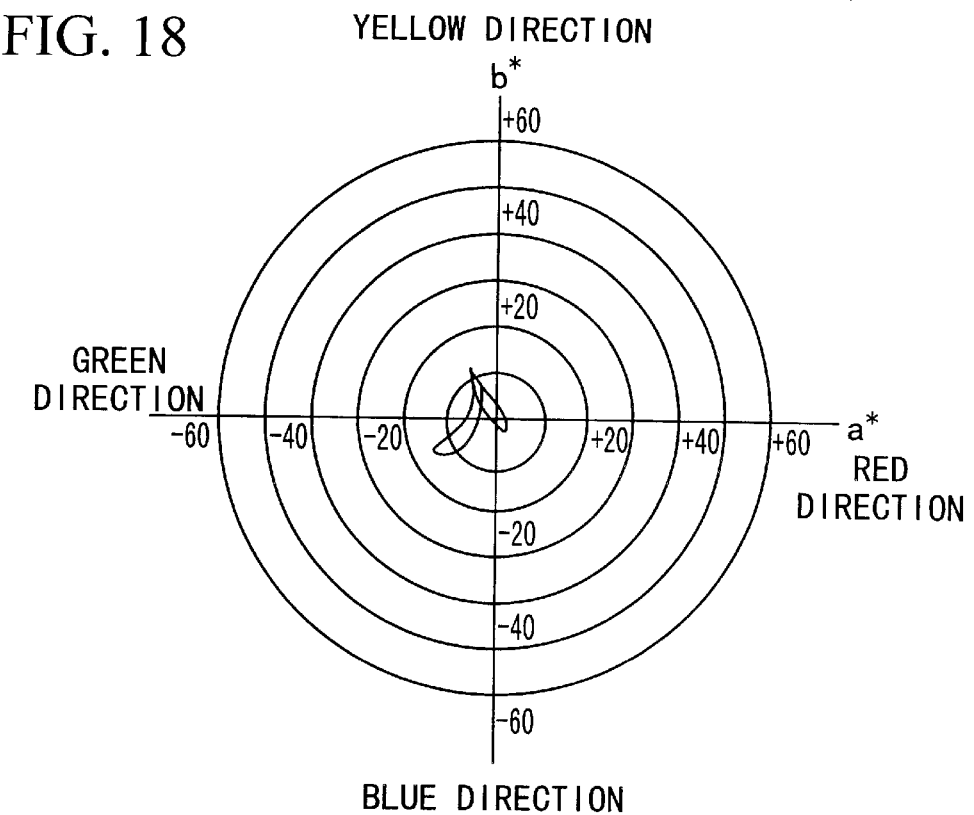
FIG. 18 is a graph showing the locus of the variation of the chromaticity in the present invention when the viewing angle is 60 degrees and the viewing direction varies from 0 to 360 degrees.

The reflection type liquid crystal display of the second embodiment shown in FIG. 12 will be explained specifically, as compared with a comparative example not encompassed by the present invention. In FIG. 18, the ordinate represents chromaticity (b*) from blue to yellow, and the abscissa represents chromaticity (a*) from green to red. FIG. 18 is a graph showing chromaticity, that is, the locus of the variation of the values a* and b* in the L*a*b*co-ordinates, when no voltage is applied (when displaying white), the viewing angle is 60 degrees, and the viewing direction is changed from 0 to 360 degrees. In FIG. 18, a distance from the center corresponds to the chroma C*.

The example 4 is identical to the reflection type liquid crystal display 1 shown in FIG. 12. As shown in FIG. 13, the orientation of the liquid crystal is twisted left from the upper substrate 302 to the lower substrate 303. The orientation of the liquid crystal around the middle of the liquid crystal layer 304 is parallel to the vertical direction with respect to the reflection type liquid crystal display 301.

The half wavelength phase difference film 309 is a stretched film made from polycarbonate, which generates a phase difference of a half wavelength (approximately 275 nm) between input and output monochromatic light with a wavelength of 550 nm. The quarter wavelength phase difference film 308 is a polycarbonate high polymer stretched film which generates a phase difference of a quarter wavelength (approximately 138 nm) between input and output monochromatic light with a wavelength of 550 nm.

The twist angle of the liquid crystal layer 304 is 70 degrees (rotated to the left), the value Δnd of the liquid crystal layer 304 is 0.27 μm (the cell gap: 4.0 μm), the angle α is 26 degrees, the angle β is 8 degrees, and the angle γ is –55 degrees.

Then, the voltage reflectance characteristic of the reflection type liquid crystal display 301 of the example 4 is measured. As the result, the reflectance is 40% when no voltage is applied, and the contrast ratio is 40 when a voltage of 5 V is applied.

As shown in FIG. 18, the chroma does not exceed 20 within a viewing angle of 60 degrees in all directions. Thus, the present invention prevents any undesirable change in color depending on the viewing angle.

EXAMPLE 5

The example 5 will be explained below. Except that the twist angle of the liquid crystal layer 304 is 70 degrees (left), the value Δnd of the liquid crystal layer 304 is 0.27 μm (the cell gap: 4.0 μm), the angle α is 17 degrees, the angle β is −2 degrees, and the angle γ is −62 degrees, the reflection type liquid crystal display 301 of the example 302 is identical to the example 4.

The voltage reflectance characteristic of the reflection type liquid crystal display 301 of the example 5 is measured. As the result, the reflectance is 40% when no voltage is applied, and the contrast ratio is 40 when a voltage of 5 V is applied. Thus, the example 5 of the present invention prevents any undesirable change in color depending on the viewing angle.

COMPARATIVE EXAMPLE 4

Figure 19:
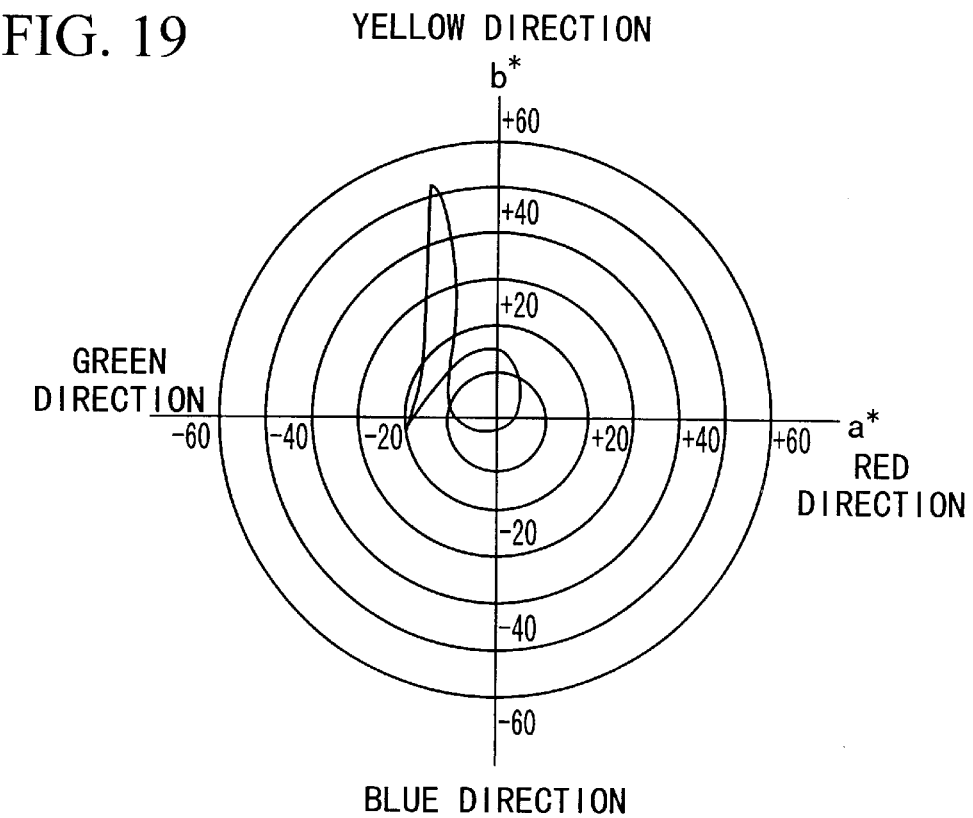
FIG. 19 is a graph showing the locus of the variation of the chromaticity in the present invention when the viewing angle is 60 degrees and the viewing direction varies from 0 to 360 degrees.
Figure 20:
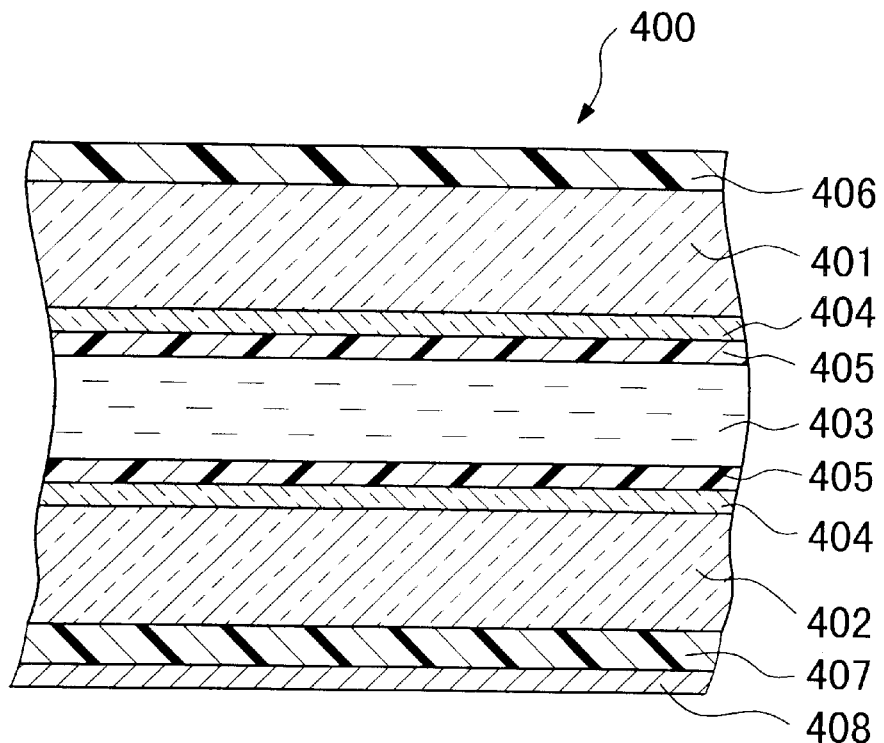
FIG. 20 is a cross-sectional side view of the first conventional TN reflection type liquid crystal display.
Figure 21:
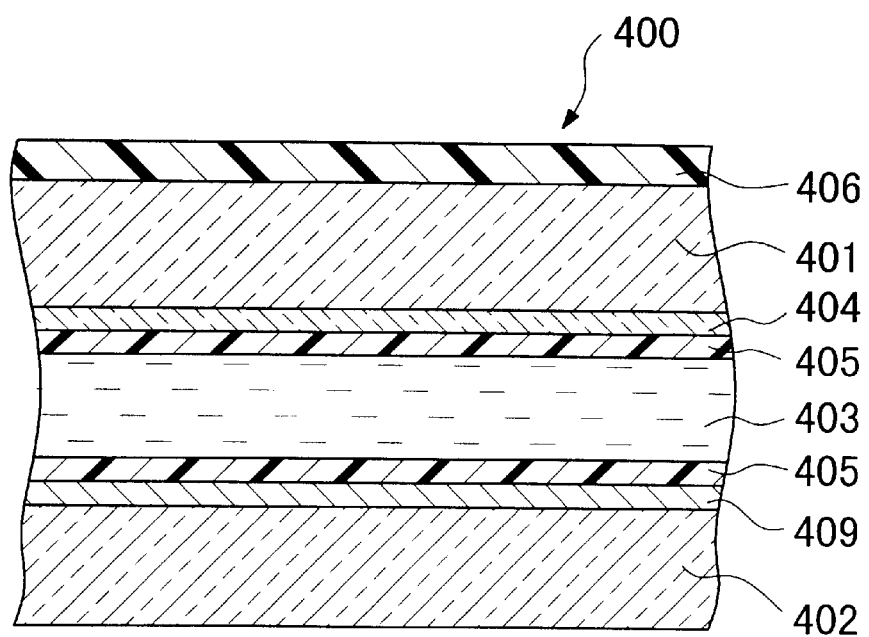
FIG. 21 is a cross-sectional side view of the second conventional reflection type liquid crystal display.
Figure 22:
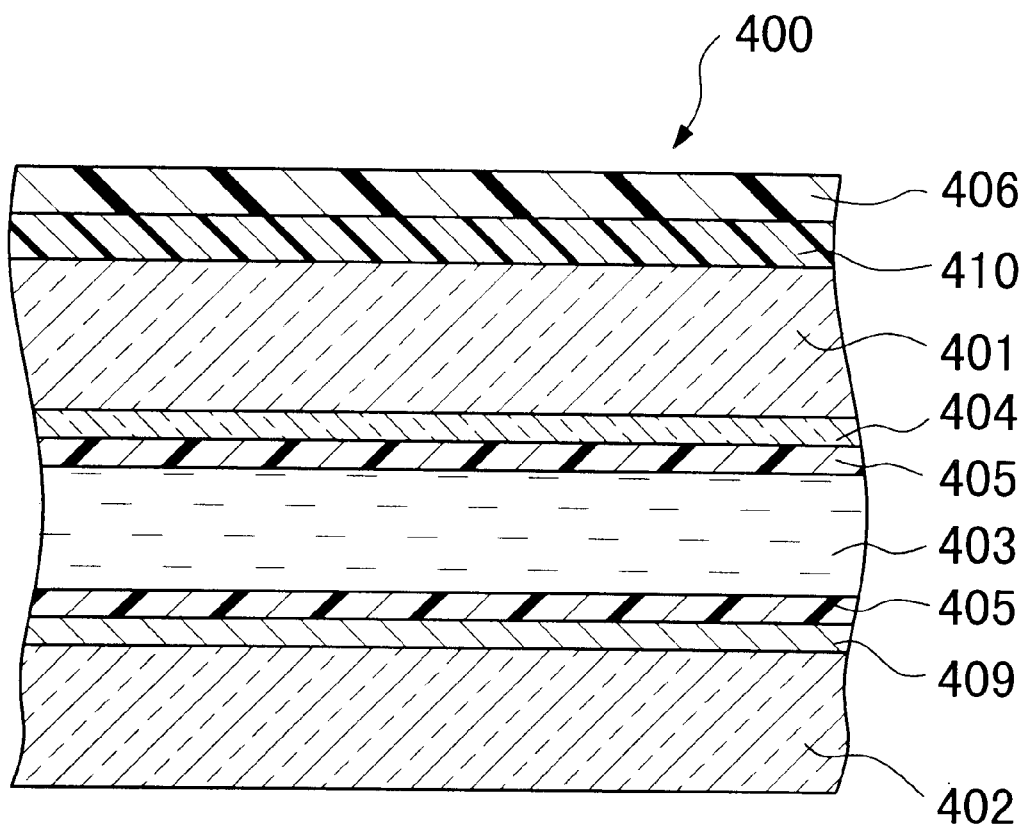
FIG. 22 is a cross-sectional side view of the third conventional reflection type liquid crystal display.

The comparative example 4 will be explained. In FIG. 19, the ordinate represents chromaticity (b*) from blue to yellow, and the abscissa represent chromaticity (a*) from green to red. FIG. 19 is a graph showing chromaticity, that is, the locus of the variation of the chromaticity, when no voltage is applied (when displaying white), the viewing angle is 60 degrees, and the viewing direction is changed from 0 to 360 degrees. In FIG. 19, a distance from the center corresponds to the chroma C*.

Except that the twist angle of the liquid crystal layer 304 is 70 degrees (left), the value Δnd of the liquid crystal layer 304 is 0.27 μm (the cell gap: 4.0 μm), the angle α is 20 degrees, the angle β is 37.5 degrees, and the angle γ is 100 degrees, the reflection type liquid crystal display 301 of the comparative example 4 is identical to the example 4.

The comparative example 4 is a normally white element in which the angle α of the polarization plate 311 is set to the most suitable value in the structure of the normally black display according to the report by S. -T. Wu, and the half wavelength phase difference film 309 and the quarter wavelength phase difference film 308 are constructed according to the formula 3.

Then, the voltage reflectance characteristic of the comparative example 4 is measured. As the result, the reflectance is 40% when no voltage is applied, the contrast ratio is 40 when a voltage of 5 V is applied. As shown in FIG. 19, the colors on the display appear to change to the viewer depending on the viewing angle. In particular, the displayed image becomes yellowish when the viewing angle is shifted in the left-right direction (the left-right direction in FIG. 13).

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A normally-white reflection type liquid crystal display comprising:

a polarization plate;

a quarter wavelength plate;

a transparent substrate;

a transparent electrode; and a twisted nematic liquid crystal layer, wherein said polarization plate, said quarter wavelength plate, said transparent substrate, said transparent electrode, and said twisted nematic liquid crystal layer are layered in sequence from a light inputting side, and an angle between the optical axis of said quarter wavelength plate and the transmission axis of said polarization plate is below 65 degrees and above 45 degrees, or below 45 degrees and above 25 degrees.

2. A display according to claim 1, wherein the angle between the optical axis of said quarter wavelength plate and the transmission axis of said polarization plate is 39 to 43 degrees, or 47 to 51 degrees.

3. A display according to claim 1, wherein said quarter wavelength plate is a wide band quarter wavelength plate with stacked uniaxial phase difference plates.

4. A display according to claim 1, wherein a twist angle of said liquid crystal layer is 60 to 85 degrees.

5. A display according to claim 4, wherein a twist angle of said liquid crystal layer is 68 to 74 degrees.

6. A display according to claim 1, wherein the product Δnd of anisotropy of the refractive index Δn of said liquid crystal layer and the thickness of said liquid crystal layer d is 0.20 to 0.35 μm.

7. A display according to claim 6, wherein the product Δnd of anisotropy of the refractive index Δn of said liquid crystal layer and the thickness of said liquid crystal layer d is 0.24 to 0.31 μm.

\* \* \* \* \*